United States Patent [19]
Naito et al.

[11] Patent Number: 5,355,121
[45] Date of Patent: Oct. 11, 1994

[54] ALARM DEVICE FOR MAGNETO-OPTICAL DISC DRIVE UNIT

[75] Inventors: Takashi Naito; Susumu Tosaka, both of Kanagawa, Japan

[73] Assignee: Sony Corporation, Japan

[21] Appl. No.: 972,915

[22] Filed: Nov. 6, 1992

[30] Foreign Application Priority Data

Nov. 19, 1991 [JP] Japan .................................. 3-302226

[51] Int. Cl.⁵ ............................................ G08B 21/00
[52] U.S. Cl. ..................................... 340/584; 340/595; 340/607; 340/653; 364/184; 371/14
[58] Field of Search ............... 340/584, 595, 653, 609; 364/185; 371/14

[56] References Cited

U.S. PATENT DOCUMENTS 3,781,839 12/1973 Bodge .................................. 340/595
5,115,225 5/1992 Dao et al. ............................ 340/584

*Primary Examiner*—Glen R. Swann
*Attorney, Agent, or Firm*—Ronald P. Kananen

[57] ABSTRACT

An alarm device is provided with a temperature sensor for detecting an internal temperature of a magneto-optical disc drive unit having a cooling fan and a replaceable dust filter. When the internal temperature becomes higher than or equal to a predetermined temperature due to the breakdown of the fan or the silting of the filter, the alarm device indicates an abnormal condition of the drive unit by flashing an operation indicating lamp.

9 Claims, 4 Drawing Sheets

ALARM DEVICE FOR MAGNETO-OPTICAL DISC DRIVE UNIT

BACKGROUND OF THE INVENTION

Field of the Invention

The present invention relates to improvements in an magneto-optical disc drive unit, and more particularly to an alarm device which is installed to a magneto-optical disc drive unit and informs that the drive unit is in an abnormally high temperature condition.

Description of the Prior Art

It is well known that a magneto-optical disc drive unit has been practically used to drive a magneto-optical disc to which various information is recorded and played back. Such a magneto-optical disc drive unit is schematically disclosed in FIG. 3. A spindle motor 12 is arranged to rotatingly drive a magneto-optical disc 13. An optical head 14 is disposed under the magneto-optical disc 13 and connected to a slide motor 15. The slide motor 15 is arranged to move the optical head 14 in the radial direction of the magneto-optical disc 13. A laser driver and signal reader 16 is connected to the optical head 14 to drive the optical head 14 and to record data signals to the magneto-optical disc 13 according to the control signals from an address decoder (no numeral), a modulator-demodulator (no numeral), a drive controller 7 and the like. The laser driver and signal reader 16 reads the data signals recorded in the magneto-optical disc 13 through the optical head 14 according to the control signals of the modulator-demodulator, the drive controller 7 and the like. A servo circuit 11 is connected to the slide motor 15 and drives the slide motor 15 in order to carry out the moving control of the optical head 14 in the radial direction of the magneto-optical disc 13 and a tracking. The servo circuit 11 further carries out the focus control of the optical head 14 and the rotation control of the spindle motor 12.

A bias magnet 8 is disposed above the magneto-optical disc 13, and generates an auxiliary magnetic field when data is recorded in the magneto-optical disc 13. A sensor 9 is connected to the drive controller 7 and disposed near the magneto-optical disc 13 in order to detect whether the magneto-optical disc 13 is in a loading condition or not. A load/unload driver 10 is connected to the drive controller 7 and carries out the loading and unloading of the magneto-optical disc 13.

However, the above discussed magneto-optical disc drive unit generates a lot of heat by the illumination of laser beam and the operation of the motor. Therefore, when an inner temperature of the drive unit 17 becomes higher than or equal to an allowable temperature such as 55° C., it may cause a problem such that the drive unit 17 cannot normally operate. In order to prevent such a problem from causing, it has been proposed that a cooling fan for preventing the raising of the inner temperature is installed to the magneto-optical disc drive unit 17. Such a magneto-optical disc drive unit 17 with a cooling fan 18 is disclosed in FIGS. 4 and 5. The cooling fan 18 is attached to a back surface side of the drive unit 17. A control board 19, to which a controller and the like are installed, is disposed at a back surface side of the cooling fan 18. A dust filter 20 is detachably attached to the cooling fan 18. The dust filter 20 is installed at a side facing the control board 19 of the cooling fan 18. An operation lamp 4 is installed to the magneto-optical disc drive unit 17 in order to indicate that the magneto-optical disc drive unit 17 is in an operating condition.

If the permeability of the dust filter 20 is lowered due to the silting by dust, the cooling performance of the cooling fan 18 is degraded. Accordingly, in order to avoid the trouble due to such a silting, the dust filter 20 has been conventionally exchanged with new one at predetermined periods such as once per several months or once a year.

However, in case that the cooling fan 18 is broken down or the permeability of the dust filter 20 is unexpectedly rapidly lowered, the inner temperature of the unit may become higher than or equal to the allowable temperature. Accordingly, the magneto-optical disc drive unit 17 may malfunction or may be broken in such a condition.

SUMMARY OF THE INVENTION

It is an object of the present invention to provide an improved magneto-optical disc drive unit which informs the necessity of the exchange of a dust filter or cooling fan when the inner temperature of the drive unit is higher than an allowable temperature.

An alarm device according to the present invention is for an optical disc drive unit having a cooling fan and a dust filter. The alarm device comprises a indicating means of an operating condition of the optical disc drive unit and a temperature sensor for detecting a temperature in the drive unit. A comparing and outputting means is arranged to compare the temperature detected by the temperature sensor with a predetermined temperature and to output a Command signal when the detected temperature is higher than a predetermined temperature. A flashing means flashingly illuminates the indicating means according to the signal from the comparing and outputting means.

With this arrangement, an operator of the optical disc drive unit is certainly noted that the optical disc is in the abnormal condition that the inner temperature of the optical disc drive unit becomes high due to the breakdown of the cooling fan or the silting of the dust filter. This wakes the exchange of the cooling fan or dust filter to the operator in order to previously prevent the malfunction or breakdown of the optical disc drive unit.

BRIEF DESCRIPTION OF THE DRAWINGS

In the drawings, like reference numerals designate like parts and like elements throughout all figures, in which.

DETAILED DESCRIPTION OF THE INVENTION

Figure 1:
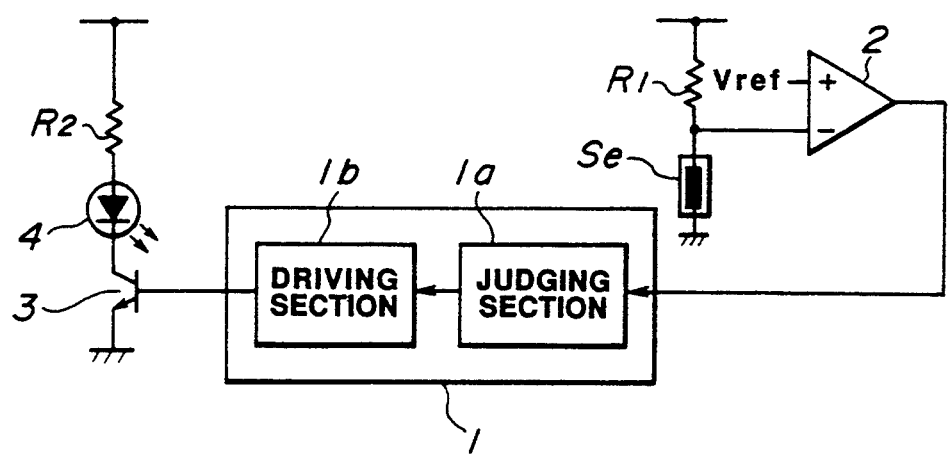
FIG. 1 is an essential circuit diagram of a first embodiment of an alarm device in a magneto-optical disc drive unit according to the present invention.
Figure 4:
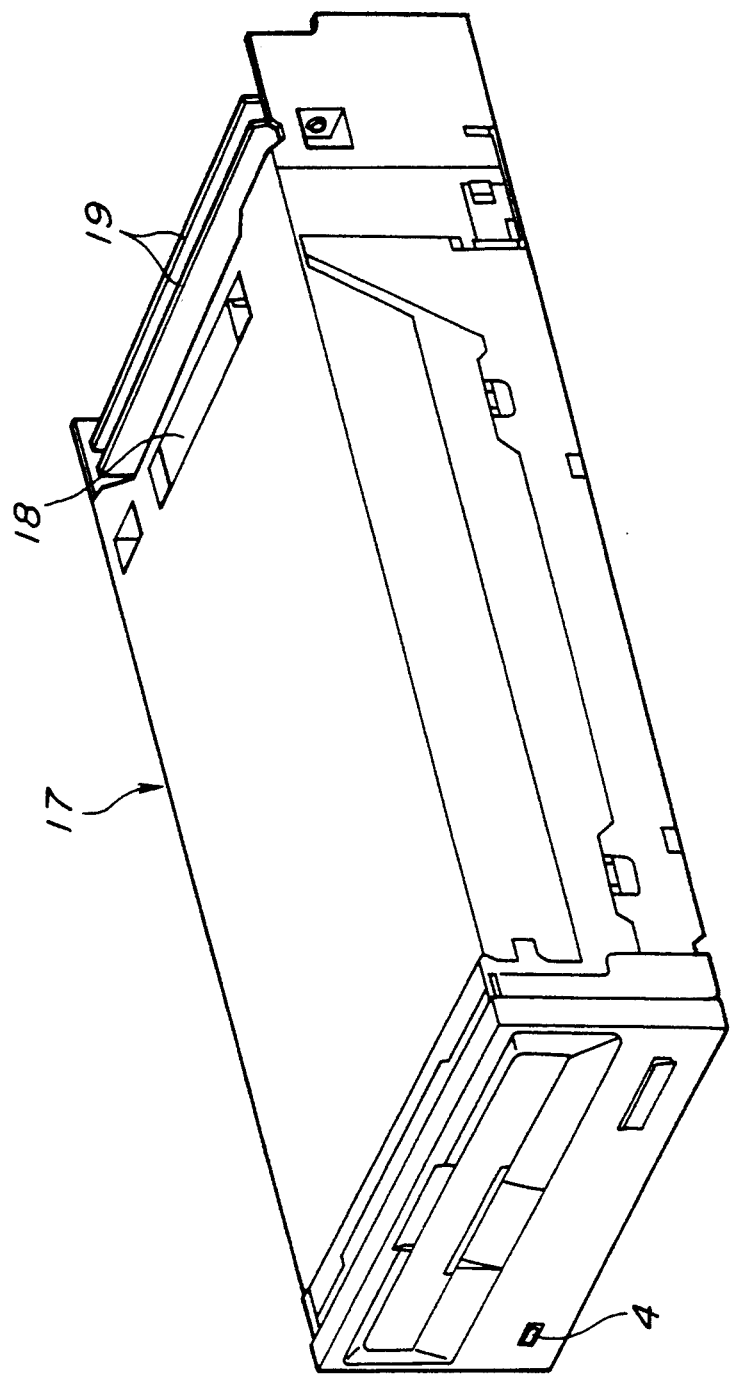
FIG. 4 is a perspective view of the conventional magneto-optical disc drive unit.
Figure 5:
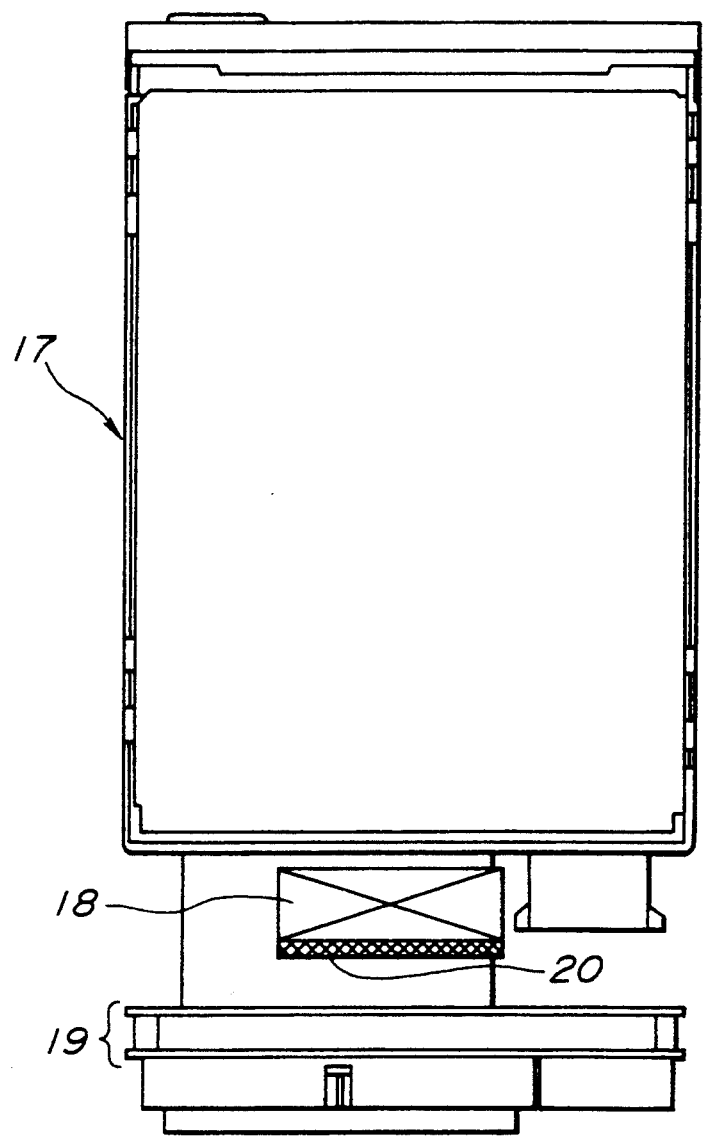
FIG. 5 is a top view of the conventional magneto-optical disc drive unit.

Referring to FIG. 1, there is shown a first embodiment of an alarm device for a magneto-optical disc drive unit with a dust filter according to the present invention. The magneto-optical disc drive unit provided with the alarm device according to the present invention is basically constructed to be similar to that of the prior art shown in FIGS. 3 to 5 and discussed in the description of the prior art of this application, except that the alarm device is installed to the magneto-optical drive unit according to the present invention. Accordingly, the further explanation of the structure of the disc operating sections will be facilitated herein.

As shown in FIG. 1, the alarm device for the magneto-optical disc drive unit comprises a temperature sensor Se therein. One end of the temperature sensor Se is grounded, and the other end is connected to an electric source (no numeral) through a resistance $R_1$. A junction between the temperature sensor Se and the resistance $R_1$ is connected to an inverting input terminal of a comparator 2. A noninverting input terminal of the comparator 2 is connected to a standard voltage $V_{ref}$. An output terminal of the comparator 2 is connected to a base of a transistor 3 through a judging section 1a and a driving section 1b of a drive controller 1. An emitter of the transistor 3 is grounded, and a collector of the transistor 3 is connected to the electric source through a green-light emitting diode (operation lamp) 4 and a resistance $R_2$.

During the operation of the magneto-optical disc drive unit, if an inner temperature of the magneto-optical disc drive unit is lower than a predetermined temperature (maximum allowable temperature), the output signal from the comparator 2 indicates "L" level. In this case, the judging section 1a generates a signal indicative of a normality of the inner temperature and sends the signal to the driving section 1b. Upon receiving the signal indicative of the normality of the inner temperature, the driving section 1b turns on the transistor 3 so as to continuously light the light emitting diode 4 in order to indicate that the magneto-optical disc drive unit is in a normal operating condition.

If the inner temperature of the magneto-optical disc drive unit becomes higher than or equal to the predetermined temperature, the output signal of the comparator 2 is changed to "H" level. In this condition, the judging section 1a generates a signal indicative of the abnormality of the inner temperature and sends the signal to the driving section 1b. The driving section 1b periodically turns on and off the transistor 3 so as to flash the light emitting diode 4 in order to indicate that a cooling fan or dust filter is in an abnormal condition.

Figure 3:
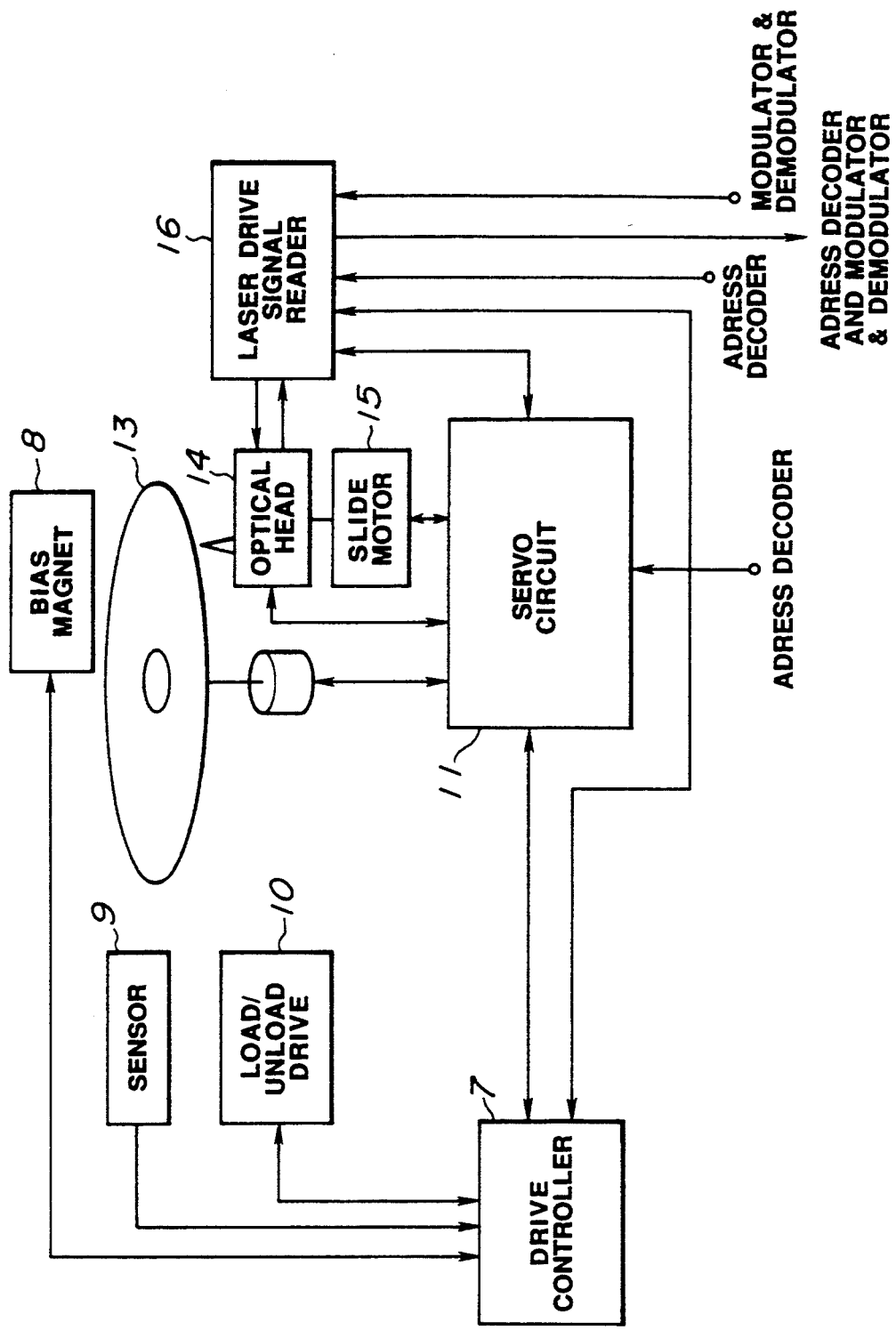
FIG. 3 is a schematic diagram showing a basic structure of a conventional magneto-optical disc drive unit.

The drive controller 1 further has a function which is similar to that of a drive controller 7 shown in FIG. 3.

With the thus arranged magneto-optical disc drive unit, when the inner temperature of the magneto-optical disc drive unit is higher than or equal to the predetermined temperature, the light emitting diode 4 is repeatingly flashed to inform the abnormality of the cooling fan or dust filter. Accordingly, the necessity of the exchange of the cooling fan or dust filter is informed in order that the magneto-optical disc drive unit is prevented from malfunctioning or going into trouble.

Figure 2:
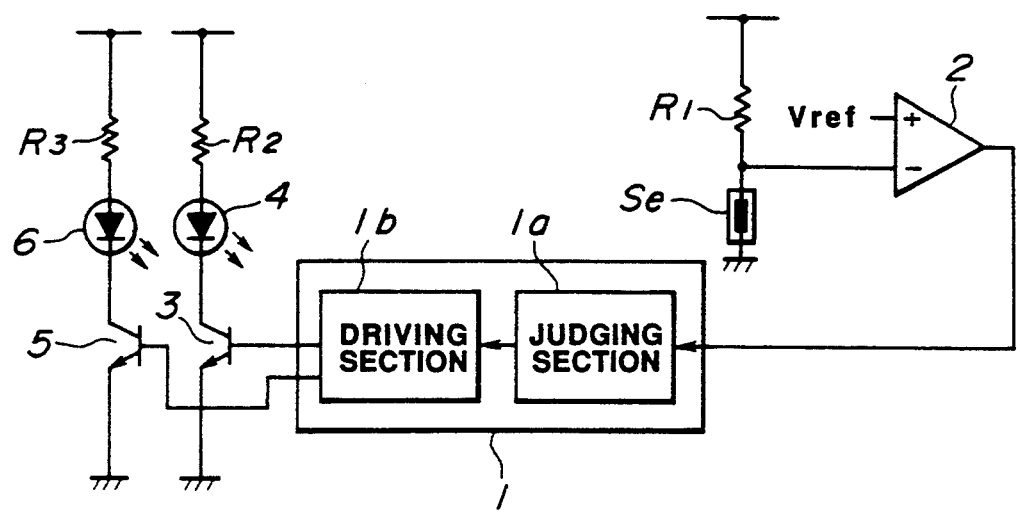
FIG. 2 is an essential circuit diagram of a second embodiment of the alarm device in the magneto-optical disc drive unit according to the present invention.

FIG. 2 shows a second embodiment of the alarm device for the magneto-optical disc drive unit according to the present invention.

As shown in FIG. 2, an emitter of a transistor 5 is grounded and a collector of the transistor 5 is connected to an electric source through a red-light emitting diode (warning illuminating means) 6 and a resistance $R_3$. A base of the transistor 5 is connected to an output side of the driving section 1b.

During the operation of the magneto-optical disc drive unit, if an inner temperature of the magneto-optical drive unit is lower than a predetermined temperature (maximum allowable temperature), the driving section 1b turns on the transistor 3 so as to continuously illuminate the light emitting diode 4 in order to indicate that the magneto-optical disc drive unit is in an operating condition. Furthermore, a transistor 5 is kept in an off condition so as not to turn on the red-light emitting diode 6.

If the inner temperature of the magneto-optical disc drive unit becomes higher than or equal to the predetermined temperature, the driving section 1b turns on the red-light emitting diode 6 to alarm that the cooling fan or dust filter is in the abnormal condition.

With this arrangement, the necessity of the exchange of the cooling fan or dust filter is informed in order that the magneto-optical disc drive unit is prevented from malfunctioning or going into trouble.

What is claimed is:

1. An alarm device for an optical disc drive unit, the optical disc drive unit having a cooling fan and a replaceable dust filter, said alarm device comprising:
   means for indicating an operating condition of the optical disc drive unit;
   a temperature sensor detecting a temperature within the unit;
   means for comparing the temperature detected by said temperature sensor with a predetermined temperature, said comparing means outputting a command signal when the detected temperature is higher than a predetermined temperature; and
   means for flashingly illuminating said indicating means in response to the signal from said comparing and outputting means.

2. An alarm device as claimed in claim 1, wherein said means for flashingly illuminating said indicating means flashes said indicating means to provide a visual signal; whereby, said visual signal may indicate to a user a defect in the cooling unit or a need for changing the periodically replaced filter.

3. An alarm device for an optical disc drive unit, the optical disc drive unit having a cooling fan and a replaceable dust filter, said alarm device comprising:
   an illuminating means;
   a temperature sensor detecting a temperature within the unit;
   means for comparing the temperature detected by said temperature sensor with a predetermined temperature, said comparing means outputting a command signal when the detected temperature is higher than a predetermined temperature; and
   means for turning on said illuminating means in response to the signal from said comparing means.

4. An alarm device as claimed in claim 3, wherein said illuminating means comprises a first indicating means having a first color and a second indicating means having a second color; and
   said means for turning on said illuminating means continuously illuminates said first indicating means having the first color when the detected temperature is lower than the predetermined temperature and the command signal from the comparing means is not present, and flashingly illuminates said second indicating means having the second color in response to the presence of the command signal.

5. An alarm device as claimed in claim 4, wherein said means for turning on said illuminating means flashes said second indicating means to provide a visual signal; whereby, said visual signal may indicate to a user a defect in the cooling unit or a need for changing the periodically replaced filter.

6. An alarm device for an optical disc drive unit, the optical disc drive unit having a cooling fan and a replaceable dust filter, said alarm device comprising:

a temperature sensor detecting a temperature within the unit;

a drive controller including a judging section which compares the temperature detected by said temperature sensor with a predetermined temperature and a driving section which outputs a command signal when the detected temperature is higher than a predetermined temperature; and an alarm lamp operated in response to the command signal.

7. An alarm device as claimed in claim 6, wherein said alarm lamp includes a light-emitting diode which is turned on in response to the command signal.

8. An alarm device as claimed in claim 6, wherein said alarm lamp includes a light-emitting diode which is continuously turned on when the command signal is not received and which is flashed when the command signal is received.

9. An alarm device as claimed in claim 8, wherein said light-emitting diode is periodically flashed to provide a visual signal; whereby, said visual signal may indicate to a user a defect in the cooling unit or a need for changing the periodically replaced filter.

* * * * *